May 14, 1957 Z. N. HOF 2,792,450

AUTOMATIC ADJUSTABLE TELEPHONE CUTOUT SWITCH

Filed April 10, 1956 2 Sheets-Sheet 1

INVENTOR.
ZYGMUNT N. HOF
BY Irving Seidman
ATTORNEY

AUTOMATIC ADJUSTABLE TELEPHONE CUTOUT SWITCH

Filed April 10, 1956 2 Sheets-Sheet 2

INVENTOR.
ZYGMUNT N. HOF
BY Irving Seidman
ATTORNEY 2,792,450
Patented May 14, 1957

2,792,450

AUTOMATIC ADJUSTABLE TELEPHONE CUTOUT SWITCH

Zygmunt N. Hof, Rochester, N. Y.

Application April 10, 1956, Serial No. 577,407

7 Claims. (Cl. 179—2)

This invention relates to a control switch and, more particularly, to a novel switch unit forming a telephone support and operable, responsive to weight reduction when the telephone handpiece is lifted, to interrupt or reduce the sound output of a radio or television receiver.

It is a well known fact that it is difficult to carry on a telephone conversation adjacent to an operating radio or television receiver, or audio reproducer, and frequently it is not convenient to leave the telephone to tune down the volume of the loud speaker by operating the volume control of the radio or television receiver. Such instances occur quite frequently, as when a phone call is received during a radio or TV program.

Many arrangements have been proposed for automatically reducing the sound volume of a radio or TV set when a telephone receiver is lifted. However, many of such devices have proposed some electrical modification of the telephone, which is not approved by telephone companies. Other arrangements have been unduly complicated or expensive, and liable to malfunctioning.

In accordance with the present invention, an automatic sound volume reducing unit is provided in the form of a weight responsive control switch mounted in a support for a telephone instrument. The telephone rests on the support and its weight maintains the control switch ineffective. When the handset is picked up, the reduction in the weight on the support results in automatic operation of the control switch which is connected by a two wire cord to the loud speaker coil of a radio or TV set. Operation of the control switch cuts a resistance into the speaker circuit to reduce or intercept the energy supply to the speaker.

For an understanding of the invention principles, reference is made to the following descriptions of typical embodiments thereof as illustrated in the accompanying drawings. In the drawings.

Figures 1, 2:
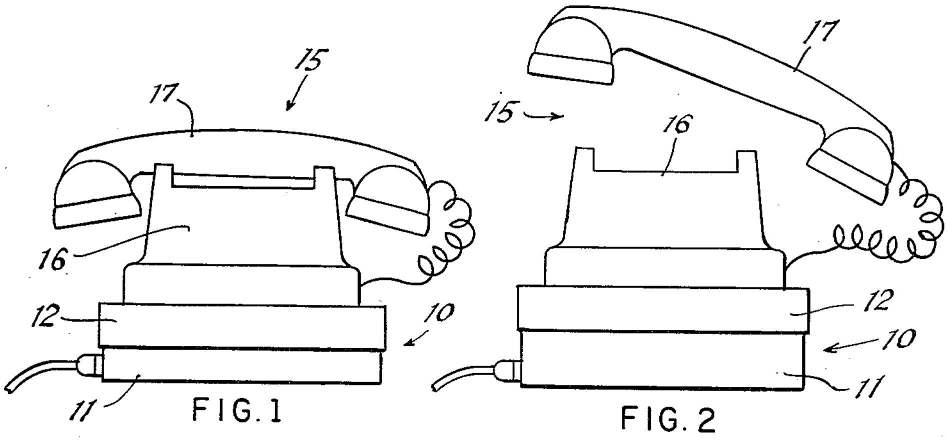
Fig. 1 is a front elevation view of the invention control unit supporting a telephone handset.
Fig. 2 is a similar view with the handset lifted.
Figure 4:
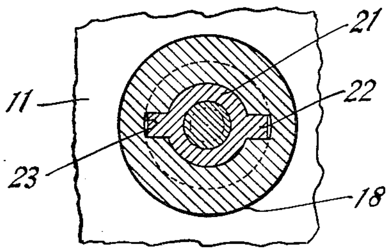
Fig. 4 is a section on the line 4—4 of Fig. 3.
Figure 3:
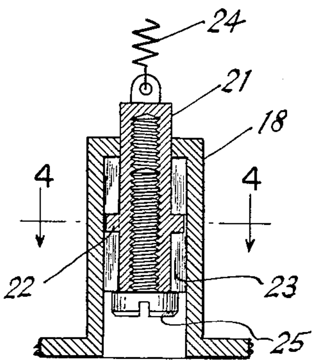
Fig. 3 is an enlarged sectional view of an instrument weight compensating adjustment means.
Figure 5:
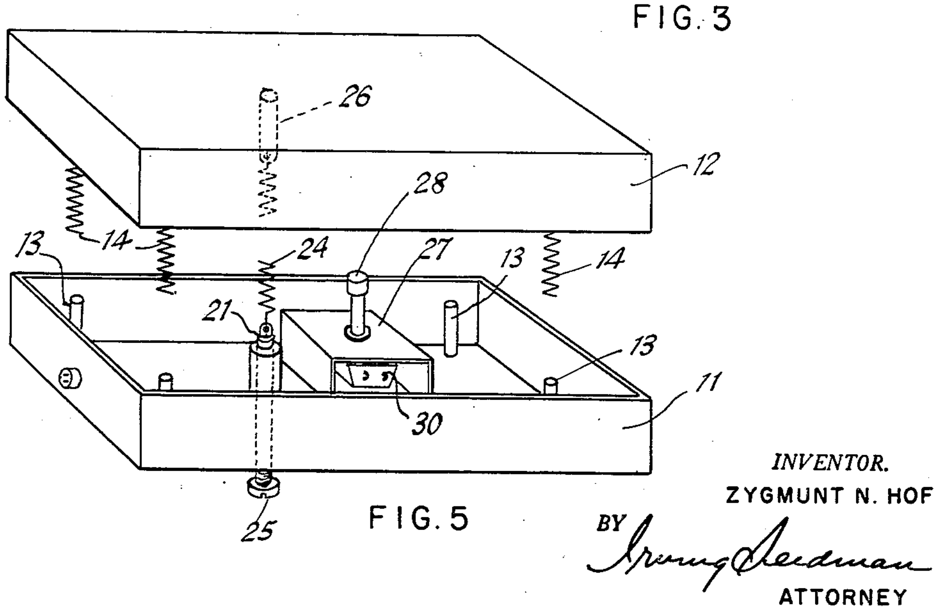
Fig. 5 is an exploded perspective view of the telephone support.
Figure 6:
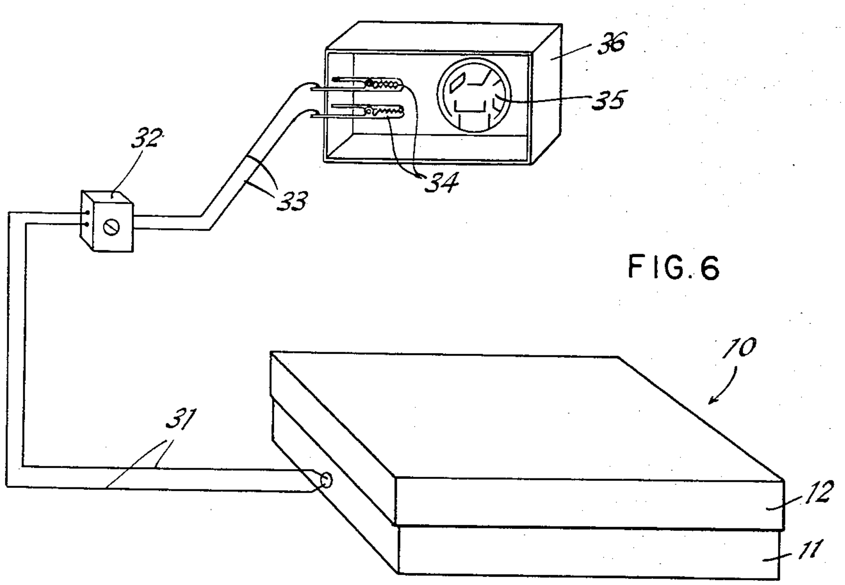
Fig. 6 is a schematic perspective view of the unit and a radio set.

Referring to Figs. 1–6, the control unit of the invention includes a telephone support stand 10 enclosing a control switch 30 connected by a two-wire cord 31 to a junction box 32 having leads 33 extending therefrom. Leads 33 have clamps 34 on their free ends for connection to the terminals of the voice coil of a loudspeaker 35 shown as incorporated in a radio receiver 36.

Stand 10 comprises a preferably rectangular base 11 having a mating cover 12 telescoped thereover. Posts

13 in the base and the cover position coil springs 14 engaged between the cover and base and biasing the two parts of stand 10 away from each other. Stand 10 is arranged to support a telephone instrument 15 including a cradle 16 resting on cover 12 and a handset 17 normally resting in cradle 16.

As telephone instruments and/or handsets may vary in weight, a weight compensating means is incorporated in stand 10. This means may comprise a boss 18 extending upwardly from base 11 and opening outwardly through the latter. Boss 18 slidably receives a nut 21 having ears 22 engaged in slots 23 in boss 18 to prevent turning of the nut. The upper end of the nut is connected to a tension coil spring 24, connected at its opposite end to a post 26 on cover 12. A screw 25, accessible from the underside of base 11, is threaded into nut 21. The head of screw 25 rests against the bottom of the boss 18. By turning screw 25, the tension of spring 24 is adjusted. This spring "bucks" springs 14 and thus controls the force urging cover 12 upwardly from base 11. Screw 25 is adjusted in accordance with the weight of instrument 15 and handset 17.

Switch 30 is mounted beneath a bracket 27 on base 11 and has an operating plunger 28 engaged with cover 12. When instrument 15 is placed on support 10 with handset 17 resting in cradle 16, the weight on cover 12 is sufficient to compress springs 14 so that cover 12 moves downwardly to the position of Fig. 1. Such downward movement of the cover depresses operating plunger 28 of control switch 30. When handset 17 is lifted from cradle 16, the decrease in the weight of instrument 15 allows springs 14 to move cover 12 upwardly allowing upward movement of switch operator 28. This relation of base 11 and cover 12 is illustrated in Fig. 2.

When instrument 15 is initially positioned on stand 10, screw 25 is adjusted to set the proper countertension of spring 24 so that, with handset 17 lifted from cradle 16, switch plunger 28 will be fully extended and, with handset 17 on cradle 16, the plunger 28 will be fully depressed.

Figure 7:
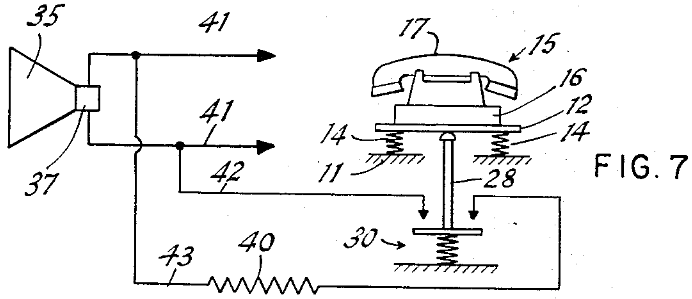
Figs. 7 and 8 are schematic wiring diagrams of alternative embodiments of the unit.
Figure 8:
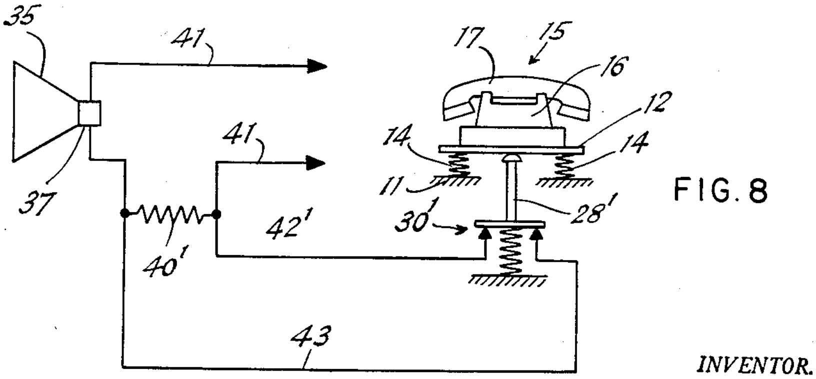

Figs. 7 and 8 show two alternative wiring arrangements for the control unit. Loud speaker 35 is shown in Fig. 7 as having leads 41 connecting the same to the output transformer of the radio or TV set. Switch 30 is illustrated as a normally closed switch biased toward the closed position and held open by depression of plunger 28. Leads 42, 43 connect the switch to the terminals of the operating coil 37 of speaker 35 and a resistor 40 is connected in series with lead 43, for example by mounting in junction box 32. When handset 17 is lifted from cradle 16, to answer a phone call, switch 30 closes to connect resistance 40 across leads 41. The value of resistance 40 is selected so as to reduce the speaker output to a convenient level while still maintaining an effective load on the secondary of the output transformer. When handset 17 is replaced in cradle 16, switch 30 is opened and the speaker volume returns to normal.

In Fig. 8, switch 30' is illustrated as a normally open switch biased to the closed position when handset 17 is placed in cradle 16. A resistor 40' is cut into one lead 41 and switch leads 42', 43' are connected to the resistor terminals. When handset 17 is lifted, switch 30' opens removing the shunt from resistor 40' and cutting the latter in effective series relation with speaker coil 37. Replacement of handset 17 in cradle 16 recloses switch 30' to again shunt resistor 40' restoring speaker 35 to normal volume.

While specific embodiments of the invention have been shown and described in detail to illustrate the application of the invention principles, it will be understood that the invention may be embodied otherwise without departing from such principles.

What is claimed is:

1. Apparatus for reducing the output of a loud speaker during a phone call comprising, in combination, a stand arranged to support a telephone instrument, and including a base and a cover slidably telescoped over said base; first coil spring means biasing said cover away from said base; second tension coil spring means biasing said cover toward said base in opposition to said first coil spring means; means operable to adjust the tension of said second coil spring means to compensate for variations in the weight of telephone instruments; said cover, when the telephone handset is resting in the cradle of the instrument, being moved downwardly by the weight of the instrument and moving upwardly when the weight of the instrument on the cover is reduced by lifting of the handset from the cradle; a switch mounted in said stand and having an operator moved responsive to relative movement of said cover and base; and means, including circuit connections and components, arranged to operatively interconnect said switch to the operating coil of a loud speaker; said switch being effective, upon movement of its operator responsive to upward movement of said cover, to condition said last named means to reduce the output of a connected loud speaker.

2. Apparatus as claimed in claim 1 in which said switch is mounted in said base and has an operator engaged with said cover.

3. Apparatus as claimed in claim 1 in which said tension adjusting means includes a screw mounted through said base, a nut threaded on said screw, and a tension coil spring connected between said nut and said cover.

4. Apparatus as claimed in claim 1 in which said first coil spring means comprises coil springs embracing aligned pins on said base and cover.

5. Apparatus as claimed in claim 1 in which said last-named means includes an impedance selectively connectable to the speaker operating coil by said switch.

6. Apparatus as claimed in claim 5 in which said switch is a normally open switch, and said impedance is connected in series in one of a pair of leads arranged to connect said switch across a speaker operating coil.

7. Apparatus as claimed in claim 5 in which said switch is a normally closed switch, and said impedance is connected across said switch for shunting thereby and is arranged to be connected in series with a speaker operating coil.

References Cited in the file of this patent

UNITED STATES PATENTS

| | | |
|---|---|---|
| 1,960,214 | Deron | May 22, 1934 |
| 1,966,184 | O'Neill | July 10, 1934 |